US012748383B2

(12) United States Patent
Michelet et al.

(10) Patent No.: US 12,748,383 B2
(45) Date of Patent: Sep. 29, 2026

(54) METHOD FOR TREATING A BALANCE SPRING FOR A HOROLOGICAL MOVEMENT

(71) Applicant: Nivarox-FAR S.A., Le Locle (CH)

(72) Inventors: Lionel Michelet, Sainte-Croix (CH); Christian Charbon, Chézard-St-Martin (CH); Marco Verardo, Les Bois (CH)

(73) Assignee: NIVAROX-FAR S.A., Le Locle (CH)

( * ) Notice: Subject to any disclaimer, the term of this patent is extended or adjusted under 35 U.S.C. 154(b) by 175 days.

(21) Appl. No.: 18/647,593

(22) Filed: Apr. 26, 2024

(65) Prior Publication Data

US 2024/0393744 A1 Nov. 28, 2024

(30) Foreign Application Priority Data

May 24, 2023 (EP) .................................... 23175181

(51) Int. Cl.
*G04D 3/00* (2006.01)
*G04B 17/06* (2006.01)

(52) U.S. Cl.
CPC ......... *G04D 3/0089* (2013.01); *G04B 17/063* (2013.01); *G04B 17/066* (2013.01)

(58) Field of Classification Search
CPC ... G04B 17/063; G04B 17/066; G04D 3/0089
See application file for complete search history.

(56) References Cited

U.S. PATENT DOCUMENTS

| | | | | |
|---|---|---|---|---|
| 2008/0049561 A1* | 2/2008 | Ozawa | G04G 13/021 368/291 |
| 2015/0301502 A1* | 10/2015 | Cusin | G04B 17/24 368/171 |
| 2021/0088971 A1 | 3/2021 | Charbon et al. | |

FOREIGN PATENT DOCUMENTS

| | | | |
|---|---|---|---|
| CN | 115685717 A | 3/2023 | |
| EP | 039 352 A1 | 9/2000 | |
| EP | 1039352 A1 * | 9/2000 | A01G 18/69 |
| EP | 667 433 A1 | 6/2020 | |
| EP | 3 828 642 A1 | 6/2021 | |

OTHER PUBLICATIONS

European Search Report for EP 23 17 5181 dated Oct. 24, 2023.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A method for treating a balance spring for a horological movement. The balance spring is made from an Nb—Ti alloy. The method includes a step of steaming, called climatic steaming, in a temperature range comprised between 30 and 100° C. in an atmosphere having a relative humidity comprised between 60 and 99%.

12 Claims, 1 Drawing Sheet

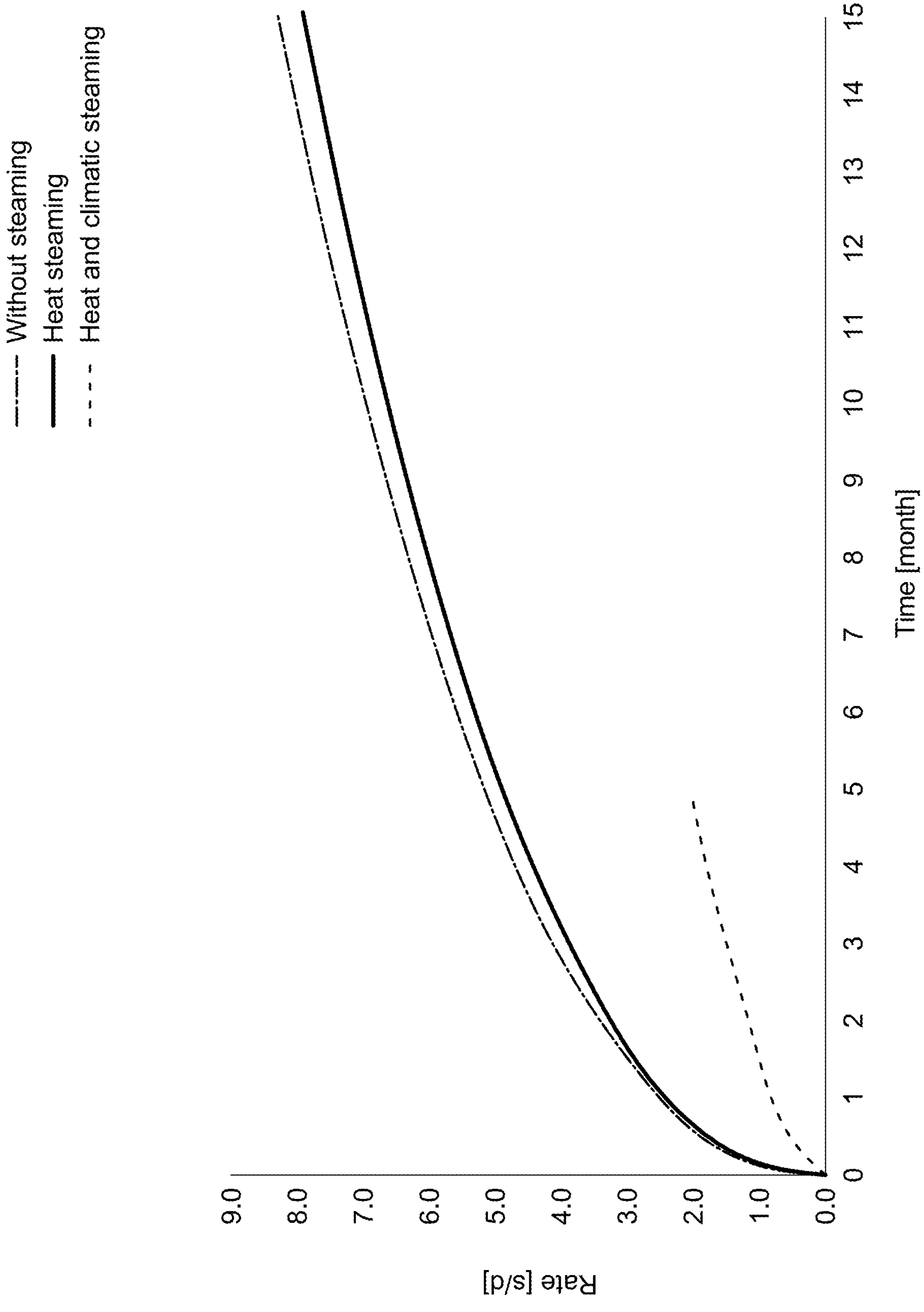
Without steaming
Heat steaming
Heat and climatic steaming
Rate [s/d]
9.0
8.0
7.0
6.0
5.0
4.0
3.0
2.0
1.0
0.0
0
1
2
3
4
5
6
7
8
9
10
11
12
13
14
15
Time [month]

METHOD FOR TREATING A BALANCE SPRING FOR A HOROLOGICAL MOVEMENT

CROSS REFERENCE TO RELATED APPLICATION

This application claims priority to European Patent Application No. 23175181.9 filed May 24, 2023, the entire contents of which are incorporated herein by reference.

FIELD OF THE INVENTION

The invention relates to a method for treating a balance spring for a horological movement. It also relates to the balance spring resulting from this treatment method.

BACKGROUND OF THE INVENTION

Watchmakers are well aware that the frequency of a balance spring oscillator drifts as a function of time.

In order to reduce this drift, it is common practice to carry out a steaming treatment, which consists of heating the balance springs to a temperature comprised between 100 and 250° C., for a period comprised between 6 and 24 hours. Steaming has the effect of restoring the material and also allowing diffusion and rearrangement of the interstitial elements, namely carbon, nitrogen and oxygen, as well as stabilising the native oxide layer. In spite of the steaming, a rate drift of more than 6 s/d was still observed after one year on the balance springs made from an Nb—Ti alloy.

SUMMARY OF THE INVENTION

The purpose of the invention is to propose a new method for treating the balance spring to reduce the rate drift. The method applies to balance springs made from a paramagnetic alloy and in particular to balance springs made from an Nb—Ti alloy with a percentage by weight of Ti comprised between 40 and 90%, preferably between 40 and 50%, relative to the total weight of the alloy.

According to the invention, the balance spring treatment method includes a step of steaming, called climatic steaming, because the steaming is carried out in an atmosphere with a controlled level of relative humidity.

More specifically, the invention relates to a method for treating at least one balance spring intended to equip a horological movement, said balance spring being made from an Nb—Ti alloy, the method comprising a step of steaming, called climatic steaming, in a temperature range comprised between 30 and 100° C. in an atmosphere having a relative humidity comprised between 60 and 99%.

Tests have shown a clear reduction in rate drift for the balance spring treated with the method according to the invention. This improvement can be attributed to the creation and growth of different forms of $TiO_2$ on the surface of the balance spring with humidity. It could also be related to the presence of water molecules adsorbed on the surface of the balance spring.

The present invention also relates to the balance spring having the feature that after 5 months of use from the time when the climatic steaming step was carried out, its rate is less than or equal to 3 s/d.

Other features and advantages of the invention will become apparent from the description and FIGURE below.

BRIEF DESCRIPTION OF THE FIGURE

The FIGURE shows the rate (s/d) as a function of time (month) for a balance spring treated using the method of the invention and, by way of comparison, two balance springs respectively untreated or treated using the standard steaming method.

DETAILED DESCRIPTION

The invention relates to a method for treating a balance spring intended to equip the balance wheel of a horological movement.

According to the invention, the treatment method can be carried out on an individual balance spring or in batch on several balance springs. It can, for example, be carried out on a plate comprising several balance springs in a barrel. It can also be carried out on an entire horological movement wherein the balance spring is mounted. By way of example, this could be an assembly comprising the balance spring and the collet, or an assembly formed by the oscillator comprising the balance wheel, the balance spring, the plate and the axis.

The balance spring is made from a paramagnetic alloy and in particular from an Nb—Ti alloy. This alloy includes between 40 and 90% by weight of titanium, possible traces of one or more elements selected from O, H, C, Fe, Ta, N, Ni, Si, Cu, Al, each of said elements being comprised between 0 and 1600 ppm of the total by weight, the balance for 100% being constituted by niobium.

According to the invention, the balance spring treatment method includes a steaming step in a temperature range comprised between 30 and 100° C. in an atmosphere with a relative humidity comprised between 60 and 99%. Preferably, the temperature range is comprised between 40 and 80° C., more preferably between 40 and 60° C. Preferably, the relative humidity is comprised between 70 and 97%, preferably between 85 and 95%, more preferably between 87 and 95%. Still preferably, the tests are carried out at ambient pressure. It is also possible to carry out the tests under a partial pressure comprised between 1 and 1000 mbar. It is also possible to carry out the tests at overpressure, for example in a steamer, at a pressure comprised between 1 and 5 bar. Different holding times are possible, with a fairly wide range from 10 minutes to 100 hours, with the time not significantly affecting the results.

The climatic steaming treatment according to the invention is preferably preceded by the standard steaming treatment known in the prior art. This standard steaming treatment is carried out under ambient humidity at a temperature comprised between 100 and 250° C. Preferably, it is carried out for a time comprised between 1 and 30 hours.

The standard steaming treatment and the climatic steaming treatment are carried out after the balance spring fixing step, which is a heat treatment well known to the person skilled in the art.

Thus, the method for manufacturing the balance spring according to the invention includes the following steps, with steps a) to f) known to the person skilled in the art:

a) production of a blank made from an Nb—Ti alloy with the above-mentioned chemical composition, b) dissolving and quenching treatment, known as the beta type, of said blank, so that the titanium and niobium are essentially in the form of a solid solution in the beta phase, c) application of deformation sequences to the alloy, optionally with one or more heat treatments. Deformation means deformation by drawing and/or rolling. Drawing may require the use of one or more dies during the same sequence or during different sequences if necessary. The wire is drawn until it has a round cross-section. Rolling can be carried out in the same deformation sequence as drawing or in a different sequence. Advantageously, the last sequence applied to the alloy is rolling, preferably with a rectangular profile compatible with the inlet cross-section of a winding spindle, d) winding to form a balance spring, e) final heat treatment for fixing, f) optional standard steaming treatment, g) climatic steaming treatment according to the invention.

The present invention also relates to the balance spring resulting from the treatment method according to the invention. The features of this balance spring are that it includes titanium oxides on its surface and potentially adsorbed water molecules. It also has the feature that after 5 months of use following the climatic steaming step, its rate is less than 3 s/d, or even 2 s/d.

Tests were carried out following the climatic steaming step. The results are shown in the FIGURE, with the rate expressed in s/d on the ordinate, measured in a Witschi Chronomaster equipment at room temperature, and the time in months on the abscissa. The tests were carried out on an Nb—Ti alloy balance spring with a weight percentage of Ti of 47%. According to the method of the invention, the balance spring was subjected to a standard steaming method in accordance with step f), carried out at 150° C. for 24 hours at ambient humidity, followed by a climatic steaming method according to step g) in an atmosphere comprising 93% relative humidity under ambient pressure at a temperature of 50° C. for 4 hours. By way of comparison, a balance spring with the same chemical composition but which had not been subjected to a treatment according to step f) or g) was tested. A balance spring with the same chemical composition that had only been subjected to step f) of standard steaming for 24 hours at 150° C. at ambient humidity was also tested. A clear reduction in the rate drift was observed for the balance spring made using the treatment method according to the invention. After 5 months, the rate was of the order of 2 s/d compared with values of the order of 5 s/d for the comparative balance springs.

The invention claimed is:

1. A method for treating at least one balance spring for a horological movement, said balance spring being made from an Nb—Ti alloy, the method comprising a step of steaming, called climatic steaming, in a temperature range comprised between 30 and 100° C. in an atmosphere having a relative humidity comprised between 60 and 99%.

2. The treatment method according to claim 1, wherein the climatic steaming step is preceded by a pre steaming step carried out under ambient air in a temperature range comprised between 100 and 250° C.

3. The treatment method according to claim 1, wherein the temperature range is comprised between 40 and 80° C. for the climatic steaming step.

4. The treatment method according to claim 1, wherein the relative humidity is comprised between 70 and 97%.

5. The treatment method according to claim 1, wherein the method is carried out under ambient pressure.

6. The treatment method according to claim 1, wherein the method is carried out under a partial pressure comprised between 1 and 1000 mbar or at overpressure with a pressure comprised between 1 and 5 bar.

7. The treatment method according to claim 1, wherein said method is carried out under ambient pressure in an atmosphere comprising between 87 and 95% relative humidity with a temperature comprised between 40 and 60° C.

8. The treatment method according to claim 1, the Nb—Ti alloy includes Ti with a percentage by weight comprised between 40 and 90%.

9. The treatment method according to claim 1, wherein the method is carried out on an individual balance spring, on several balance springs simultaneously, including on balance springs within a plate or on a balance spring mounted within an assembly of the horological movement, the treatment being applied respectively to said plate or to said assembly.

10. The treatment method according to claim 9, wherein the assembly comprises the balance spring and a collet or the assembly is formed by an oscillator which comprises a balance wheel, the balance spring, a plate and an axis.

11. A method for manufacturing at least one balance spring including a fixing step followed by the treatment method according to claim 1.

12. A balance spring obtained with the manufacturing method according to claim 11, said balance spring being configured such that after 5 months of use from the climatic steaming step, its rate is less than or equal to 3 s/d.

* * * * *